United States Patent [19]

Rugaber et al.

[11] Patent Number: 4,801,319
[45] Date of Patent: Jan. 31, 1989

[54] APPARATUS AND ASSOCIATED METHOD FOR CONTAINER SAMPLING FOR INSPECTION

[75] Inventors: David A. Rugaber; Richard N. Maxson, both of Butler, Pa.

[73] Assignee: American Glass Research, Inc., Butler, Pa.

[21] Appl. No.: 118,766

[22] Filed: Nov. 9, 1987

[51] Int. Cl.[4] .............................................. C03B 35/10
[52] U.S. Cl. .......................................... 65/29; 65/158; 65/FIG. 13; 209/523; 209/526
[58] Field of Search .................... 65/158, DIG. 13, 29; 209/522, 523, 526

[56] References Cited

U.S. PATENT DOCUMENTS

| | | | |
|---|---|---|---|
| 2,800,226 | 7/1957 | Drennan | 209/111 |
| 3,074,550 | 1/1963 | Moreland et al. | 209/526 |
| 3,628,658 | 12/1971 | Cotter | 209/522 |
| 4,004,904 | 1/1977 | Fergusson | 65/158 |
| 4,205,973 | 6/1980 | Ryan | 65/29 |
| 4,332,606 | 6/1982 | Gardner | 65/158 |
| 4,614,531 | 9/1986 | Bishop et al. | 65/158 |
| 4,639,263 | 1/1987 | Kulikauskas | 65/158 |

Primary Examiner—Arthur Kellogg
Attorney, Agent, or Firm—Arnold B. Silverman

[57] ABSTRACT

Apparatus for transporting and inspecting containers includes an annealing lehr disposed on one side of a primary conveyor and a stacker having a reciprocating pusher bar adapted to transport containers from the primary conveyor into the annealing lehr. Inspection apparatus is positioned adjacent to the primary conveyor. The stacker pusher bar preferably has a series of gates which permit a predetermined container which is to be inspected to pass through the pusher bar when the pusher bar is moved toward the annealing lehr to deliver the other containers thereto. The gates may advantageously be slidable or rotatable and be operated on an individual basis by actuators. The inspection equipment may be provided with conveyors to transport the containers to be inspected from the primary conveyor to the inspection apparatus and to transport the inspected containers which pass inspection to the primary conveyor or annealing lehr. A forming machine which molds the containers is connected with the primary conveyor by means of a take-away conveyor. Inspection is accomplished at the hot end of the lehr. In another embodiment, the containers to be inspected are withdrawn from the take-away conveyor, inspected and if acceptable, delivered to the primary conveyor or directly to the lehr. An associated method is provided.

48 Claims, 11 Drawing Sheets

APPARATUS AND ASSOCIATED METHOD FOR CONTAINER SAMPLING FOR INSPECTION

BACKGROUND OF THE INVENTION

1. Field Of The Invention

This invention relates to apparatus and an associated method for inspecting containers in an automated sampling manner and, more specifically, with respect to glass containers effecting said inspection prior to entry of the container into the entry hot end of an annealing lehr.

2. Description Of The Prior Art

It has long been known to effect automated inspection of containers such as glass containers, for example, either on a continuous basis wherein each container is inspected or on a sampling basis wherein periodically container is removed in order to inspect for a group of properties which tend to be slow to change.

It has been known to measure the volume and shape of a glass gob which was intended to be employed in a glass forming machine. See U.S. Pat. No. 4,205,973.

It has also been known to fill the annealing lehr in such a manner that containers from each mold in the forming machine occupy a given column or columns in the lehr. See U.S. Pat. No. 4,004,904. This patent, however, discloses a system wherein identification of defective containers is made later in the process. This patent teaches a method of marking and disposing of said defective containers after the bottles have been annealed in the lehr.

It has also been known to reject bottles at the hot end of the line prior to their entering an annealing lehr. The human operator sets a control switch which instructs the reject control as to which bottles are to be discarded by the rejector. See U.S. Pat. No. 4,332,606.

U.S. Pat. No. 4,614,531 discloses a computer control system for operating a reject mechanism in a glassware forming machine as the glassware exits the mold section thereof. This system performs generally the same function as that disclosed in U.S. Pat. No. 4,332,606, but employs different hardware.

U.S. Pat. No. 4,639,263 discloses a method for inspecting glassware during production and acquiring data therefrom. This patent discloses very limited inspection performed on every container produced. Reject devices are provided for eliminating defective products.

U.S. Pat. No. 2,800,226 also discloses a system for removing bottles from a conveyor line. It has also been known to have plant workers remove a container manually on a periodic basis for purposes of inspection.

In spite of the previously known systems, there remains a real and substantial need for improved apparatus and an associated method for effecting, on a sampling basis, inspection of containers prior to entry thereof into an annealing lehr in an automated and efficient manner.

SUMMARY OF THE INVENTION

The apparatus and associated method of the present invention provides a primary conveyor which positions an array of containers adjacent to an annealing lehr and stacker means having a reciprocating pusher bar which urges the containers except for predetermined containers to be inspected into the annealing lehr in rows.

One embodiment of the invention provides a pusher bar having a plurality of gates which are adapted to be aligned with a container positioned on a primary conveyor and which is to be inspected. Opening of the gate results in a pusher bar urging the other containers into the lehr, but having the container to be inspected pass through the open gate and then be transferred to inspection means. In an alternate embodiment, the pusher bar is of lesser width than the array of containers thereby permitting an end container to remain on the primary conveyor and be delivered to the inspection means.

Control means are employed to coordinate operation of the pusher bar, the gates, the inspection means and the container forming machine and take-away conveyors which deliver newly formed containers from the forming machine to the primary conveyor It will be appreciated that reference herein will be made to both a take-away conveyor and a primary conveyor which may be endless belt types of conveyors. If desired, a single conveyor may be employed for both purposes.

By effecting the inspection at the hot end of the lehr, more timely information regarding the nature of the containers being inspected may be obtained and may be used more quickly in subsequent production operations.

It is an object of the present invention to provide apparatus and a method for the efficient sampling of containers to be inspected without affecting the smooth flow of the containers.

It is a further object of the present invention to effect such sampling inspection before the containers to be inspected have entered the lehr.

It is a further object of the present invention to make the inspection results available in a timely manner so as to enhance efficiency of production.

It is a further object of this invention to accomplish these objectives in a simple and economical manner which is compatible with other systems for production and inspection of containers.

These and other objects of the invention will be more fully understood from the following description of the invention on reference to the illustrations appended hereto.

DESCRIPTION OF THE PREFERRED EMBODIMENTS

As used herein the term "container" or "containers" shall be deemed to include unfilled glass containers which may be at an elevated temperature as a result of their having been molded immediately prior to the processing taking place in this invention.

Figure 1:
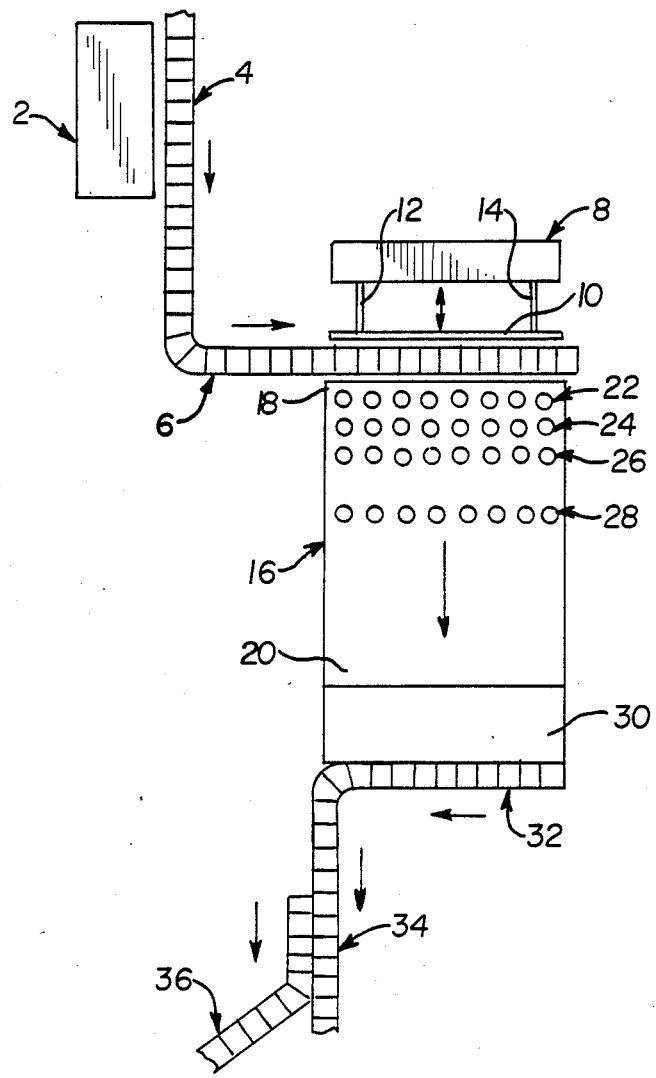
FIG. 1 is a schematic plan view of a form of a prior art container manufacturing and inspecting system.

FIG. 1 shows a prior art form of apparatus for manufacturing and inspecting of glass containers on a sampling basis.

Referring now more specifically to FIG. 1, there is shown schematically a prior art system wherein glass containers are molded in molds contained in a forming machine 2 emerge therefrom and are transported in the direction indicated by the arrows on take-away conveyor 4 which is operatively associated with cross or primary conveyor 6. The conveyor 6 is interposed between the stacker mechanism 8 and the annealing lehr 16.

In operation, a series of containers in single file will be positioned on the primary conveyor 6 adjacent to the lehr 16. Pusher bar 10 reciprocates in a direction generally perpendicular to the path of movement of the primary or cross conveyor 6. The pusher bar 10 is fixedly secured to a pair of guide rods 12, 14 which are received within and are subjected to relative reciprocating movement with respect to stacker 8. Movement of the pusher bar 10 toward the annealing lehr 16 results in delivery of a row of the containers such as 22 into the annealing lehr. Four such rows, 22, 24, 26, 28 are shown in FIG. 1.

The annealing lehr has an entry hot end 18 and a discharge cold end 20 with the containers moving on an internal conveyor in the direction indicated by the arrow. Passage of the containers through the lehr 16 may take about twenty minutes, for example. At the exit of the lehr 16 is an accumulation area 30 over which the containers pass on route to the exit conveyor 32. The containers generally positioned in single file and relative spaced relationship move along conveyor 32 to on line continuous inspection conveyor 34 with sampling inspection being accomplished on containers emerging on conveyor 36. It will be appreciated that in general sampling inspection is performed for properties which are likely to be changing slowly over a period of time.

Figure 2:
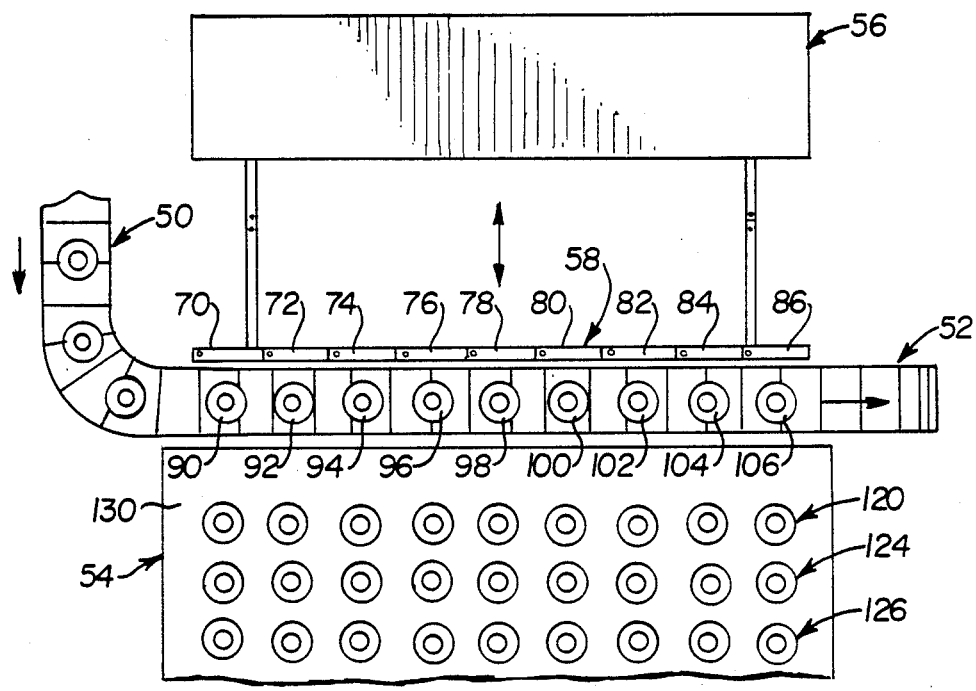
FIG. 2 is a plan schematic view of a portion of the apparatus of the present invention.

Referring to FIG. 2, features of the present invention will be considered in greater detail. A forming machine (not shown) or other source of containers, provides a supply of containers to take-away conveyor 50 which is operatively associated with primary conveyor 52. The annealing lehr 54 has an entry hot end disposed adjacent to the primary conveyor 52 and an exit cold end (not shown) disposed remote therefrom. The stacker 56 has a reciprocating pusher bar 58 which reciprocates in the direction indicated by the arrows. It is shown in FIG. 2 in the retracted position. The pusher bar 58 in this embodiment has a plurality of gates 70-86 (even numbers only) each of which is rotatable about a vertical axis and each of which is of greater width than the diameter of the containers being transported on the primary conveyor 52. As a result, when a gate is opened, an aligned container may pass freely through the open gate. As shown in FIG. 2, a series of spaced, single file containers which may be glass bottles, for example, 90-106 (even numbers only) are positioned generally centrally aligned with the gates 70-86.

Shown in the lehr 54 are a series of rows 120, 124, 126 of containers which have been introduced into the entry hot end 130. If the pusher bar 58 shown in FIG. 2 were moved toward the lehr 54 with all of the gates closed, all of the containers 90-106 would be moved into the lehr 54 to create an additional row of containers.

Figure 3:
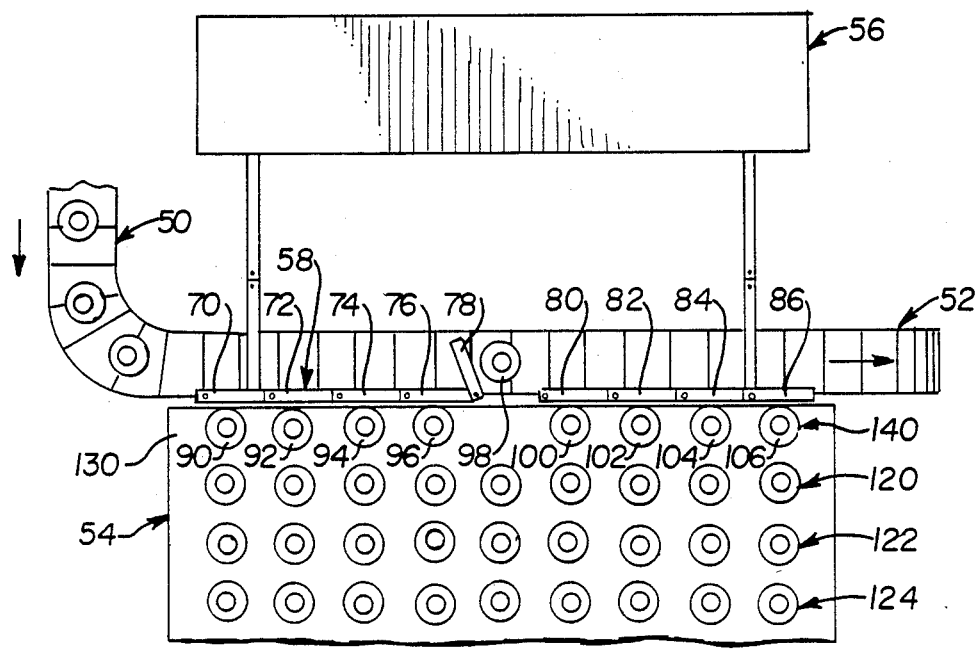
FIG. 3 is a plan view of the apparatus of FIG. 2 in the middle of a cycle of operation.

Referring to FIG. 3, it will be seen that the pusher bar 58 has been advanced to a position on the opposite side of primary conveyor 52 and has gate 78 in the open position with the remaining gates in the closed position. As a result, containers 90-96 and 100-106 have been introduced into the annealing lehr 54 to create a new row 140 of containers therein. As a result of gate 78 being in the open position, however, container 98 has remained on the primary conveyor 52 and will move to the right along with the conveyor.

By appropriate control means to be disclosed hereinafter the selection of container 98 as being a specimen related to a particular mold in the forming machine and being the container to be inspected has been accomplished. The control means also effect the timing necessary to align container 98 with the gate 78 and open the gate thereby permitting separation of the container 98 to be inspected and subsequent delivery of the same to an inspection apparatus. It will be appreciated that this separation and inspection is accomplished prior to the container's entry into lehr 54.

Figure 4:
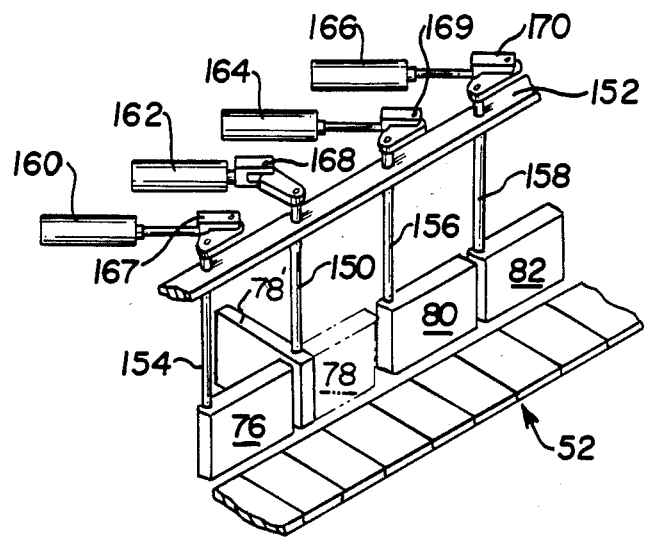
FIG. 4 is a perspective view of a form of gate of the present invention.

Referring to FIG. 4 there is shown a pusher bar having a plurality of gates such as those shown in FIGS. 2 and 3 pivoted about vertical axes. The pusher bar is positioned adjacent to primary conveyor 52 and has gate 78 journalled between rail 152 and a lower rail (not shown). Rotation of gate 78 with shaft 150 causes the gate 78 to assume an open position and will permit passage of container 98 therethrough. Similarly, gates 76, 80 and 82 have shafts 154, 156, 158 as do the other gates which are not shown in this view. Rotation of such gates may readily be effected by any desired means such as air cylinders 160, 162, 164, 166 and their associated linkages 167, 168, 169, 170, respectively, for example.

Figure 5:
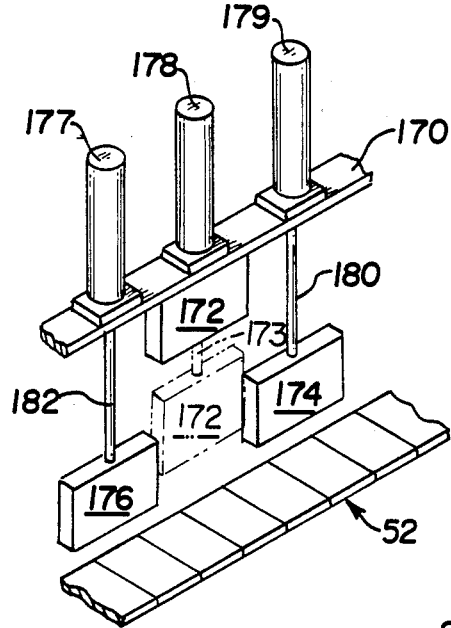
FIG. 5 is a perspective view of an alternate embodiment of the gate construction of this invention.

As is shown in FIG. 5, a vertically slidable form of gate may be employed. Gate 172 is fixedly secured to shaft 173 and assumes the open position when the shaft is elevated. Similarly, gates 174 and 176 as well as additional gates are adapted to be slidable in a vertical direction with shafts 180 and 182 to thereby reciprocate between closed and open positions. Cylinders 177, 178, 179, may be employed for this purpose.

Figure 6:
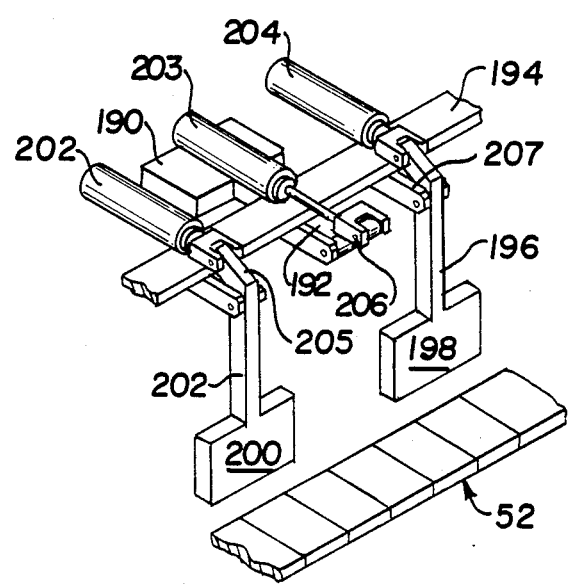
FIG. 6 is an alternate view of a form of gate of the present invention.

In the embodiment shown in FIG. 6 the gates rotate about a horizontally oriented axis. Gate 190 is fixedly secured to support 192 which in turn is hinge-mounted to rail member 194. Similarly, gates 198 and 200 are secured respectively to supports 196, 202. These gates may be operated by air cylinders 202, 203, 204 and their respective linkages 205, 206, 207.

It will be obvious to those skilled in the art that numerous means for effecting movement of the gates between open and closed positions responsive to signals from the control means may be provided. For example, air valves and cylinders or rotary solenoids may be employed to (a) rotate shafts 150, 154, 156, 158 of FIG. 4, or (b) reciprocate shafts 173, 180, 182 of FIG. 5, or (c) rotate supports 192, 196, 202 with respect to rail member 194 of FIG. 6.

It will be appreciated that other forms of movement of individual gates of the plurality so as to permit a single predetermined container to pass through the pusher bar and be isolated for inspection may be employed.

Figure 7:
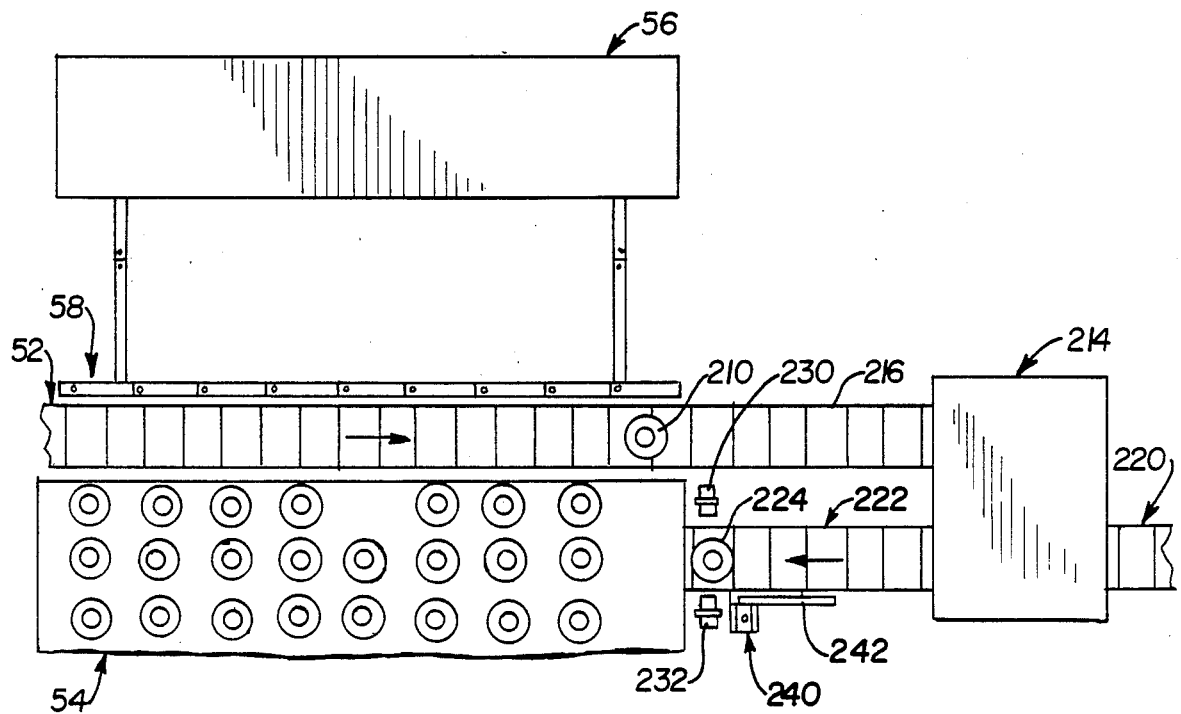
FIG. 7 is a partially schematic plan view of the form of inspection system of the present invention.

As is shown in FIG. 7, the primary conveyor 52 has a container 210 positioned thereon. This container was isolated for inspection purposes by the procedure described hereinbefore in connection with the description of FIGS. 2 and 3. In this embodiment the primary conveyor 52 serves as means for delivering container 210 to the hot end inspection equipment 214. It will be appreciated that the inspection equipment 214 may be of any desired conventional or unconventional variety as the present invention centers around delivery of the containers to the inspection equipment and return therefrom, but not on what particular properties are being inspected and what means are used to effect the inspection. As has been indicated, in general, inspection of this type involves sampling to monitor properties which are relatively slow to change such as container thickness, height or diameter as well as weight and volume. The portion of primary conveyor 52 identified generally by the number 216 may be considered as an inspection delivery conveyor. After inspection, if the container has been rejected, it will emerge from the inspection apparatus 214 on conveyor 220 to be discarded. If the container has passed the inspection test, it will be returned to the lehr 54 by the return conveyor 222. A container 224 which has passed inspection is shown on return conveyor 222 positioned between two sensors 230, 232 which confirm the presence of a container awaiting entry into the lehr 54.

Figure 7A:
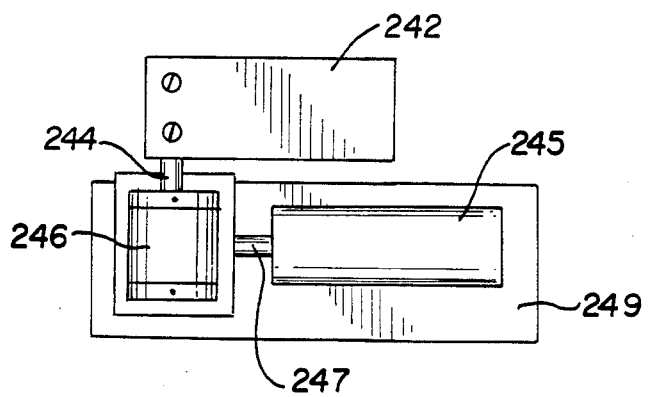
FIG. 7A is a detail of a form of bottle delivery element shown in FIG. 7.

Referring to FIG. 7A details of a preferred means of delivering the container 224 into the righthand-most portion of lehr 54 aligned with the corresponding containers of the other row will be considered. When the control means delivers a signal to initiate action of the delivery member 240, arm 242 rotates in a counter-clockwise direction until it contacts the righthand-most surface of container 224. It is then pushed into the lehr 54 by cylinder 245 which extends and moves container 224 in the direction of the lehr 54. The arm 242 is fixedly secured to a shaft 244 which is connected to rotary solenoid 246 which in turn is fixedly secured to connecting rod 247 of cylinder 245 and is actuated by the control means signal. In the form shown, solenoid 246 and cylinder 245 are secured to mounting plate 249. After completion of delivery of container 224, the arm 242 is returned to the position shown in FIG. 7.

Figure 8:
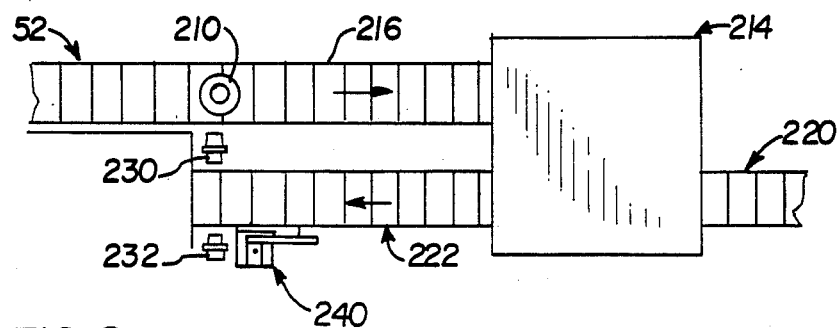
FIGS. 8 through 11 are plan views showing a cycle of operation of the inspection apparatus.
Figure 9:
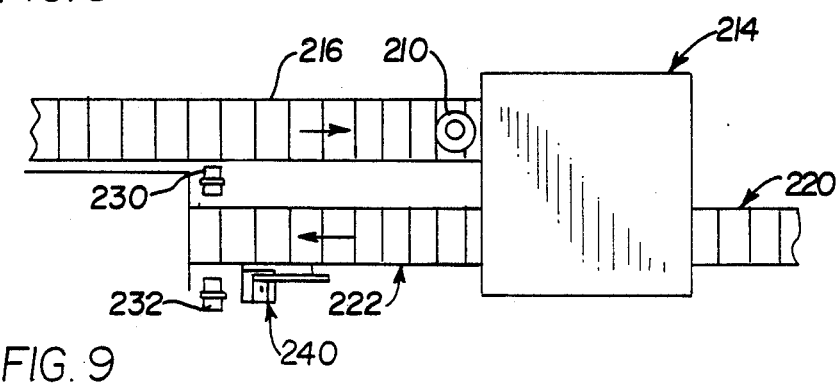
Figure 10:
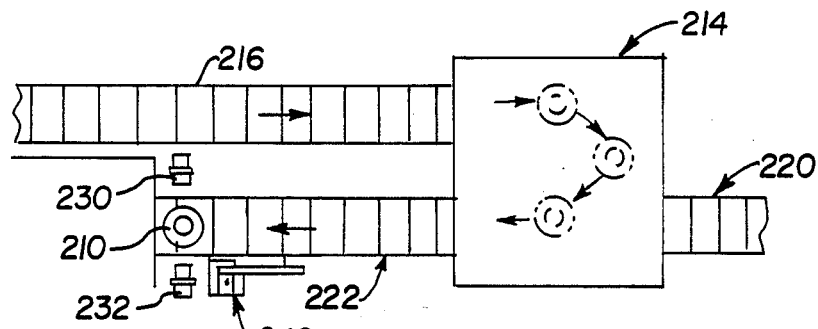
Figure 11:
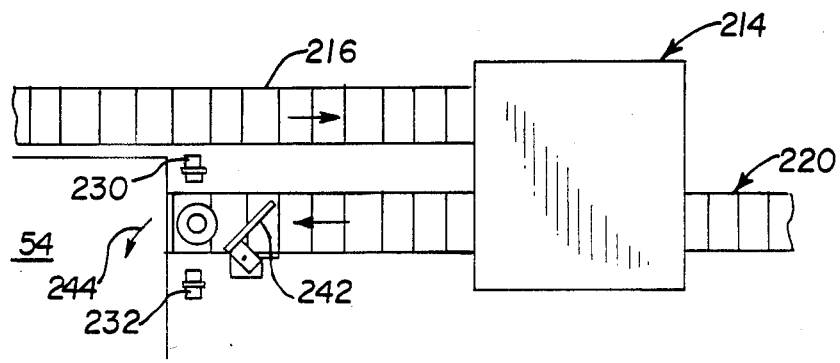

A cycle of operation of this system is illustrated in FIGS. 8 through 11 with segment 216 of primary conveyor 52 serving to deliver a container 210 to inspection apparatus 214. It will be appreciated that the segment 216 of conveyor 52 may be provided as a separate conveyor operatively associated with primary conveyor 52. For simplicity of reference herein, both concepts will be embraced by referring to the primary conveyor as being the conveyor which delivers containers to the pusher bar 58 and the delivery container 216 being referred to as a portion of the inspection means regardless of whether it is a portion of primary conveyor 52 or a separate conveyor. In FIG. 8 the container 210 has entered delivery conveyor 216 and is moving toward the inspection apparatus 214. In FIG. 9 it is about to enter the inspection apparatus 214. FIG. 10 shows schematically passage of the container through the inspection apparatus and emerging on conveyor 222 as it has passed the inspection. When the container 210 is between the sensors 230, 232 and the control means (not shown) actuates the delivery means 240 and arm 242 rotates so as to contact the container and introduce it into lehr 54 in the direction indicated by arrow 244.

Figure 12:
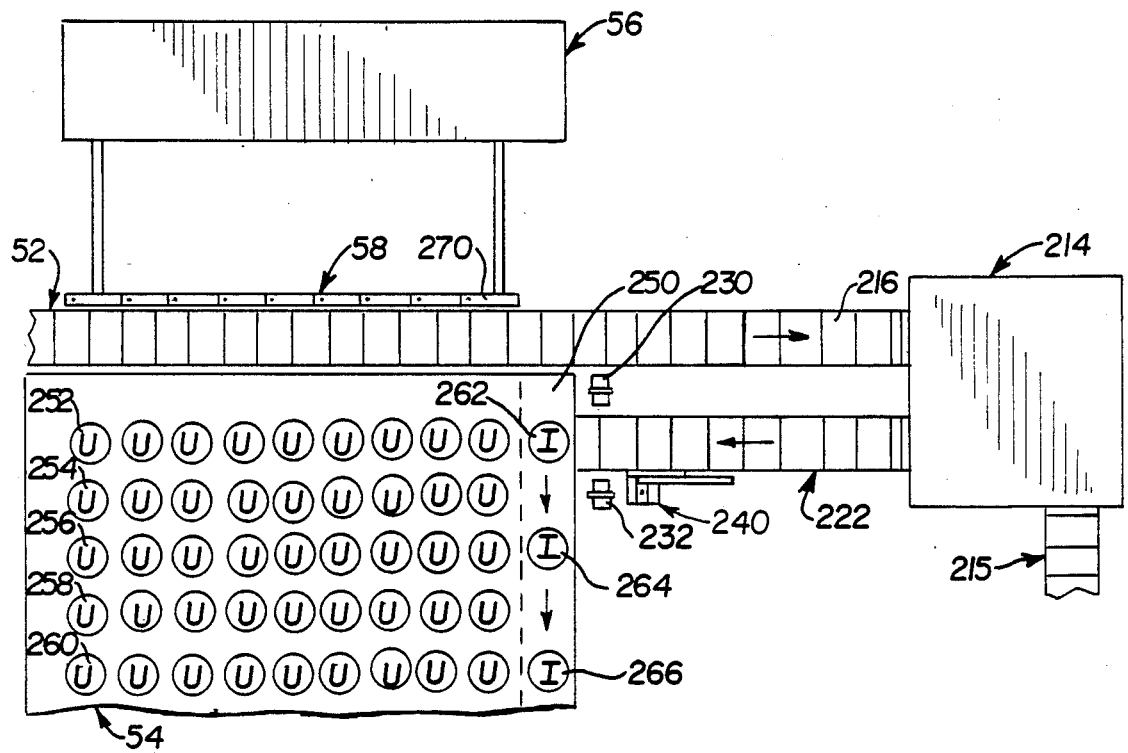
FIG. 12 is a plan view of a form of inspection apparatus of the present invention.

FIG. 12 illustrates a first mode of operation of the invention in respect of lehr positioning of the containers. In the embodiment of FIG. 12, the lane 250 of the internal conveyor of lehr 54 has been established such that none of the uninspected containers will move in that lane 250. To the left of lane 250 are a plurality of rows of containers 252, 254, 256, 258, 260 of containers bearing the label "U" to indicate that they have not been inspected. Containers 262, 264, 266 which are in lane 250 have been returned to the lehr 54 from delivery conveyor 222 of inspection means. These containers bear the legend "I". In this type of arrangement as lane 250 is reserved for containers which have passed inspection, there is no need to get into detailed coordination of timing of the re-entry of the inspected containers into the lehr 54. On the other hand, the number of containers which can be processed by lehr 54 is reduced to the extent of the loss of the use of lane 250 except for inspected containers.

Figure 13:
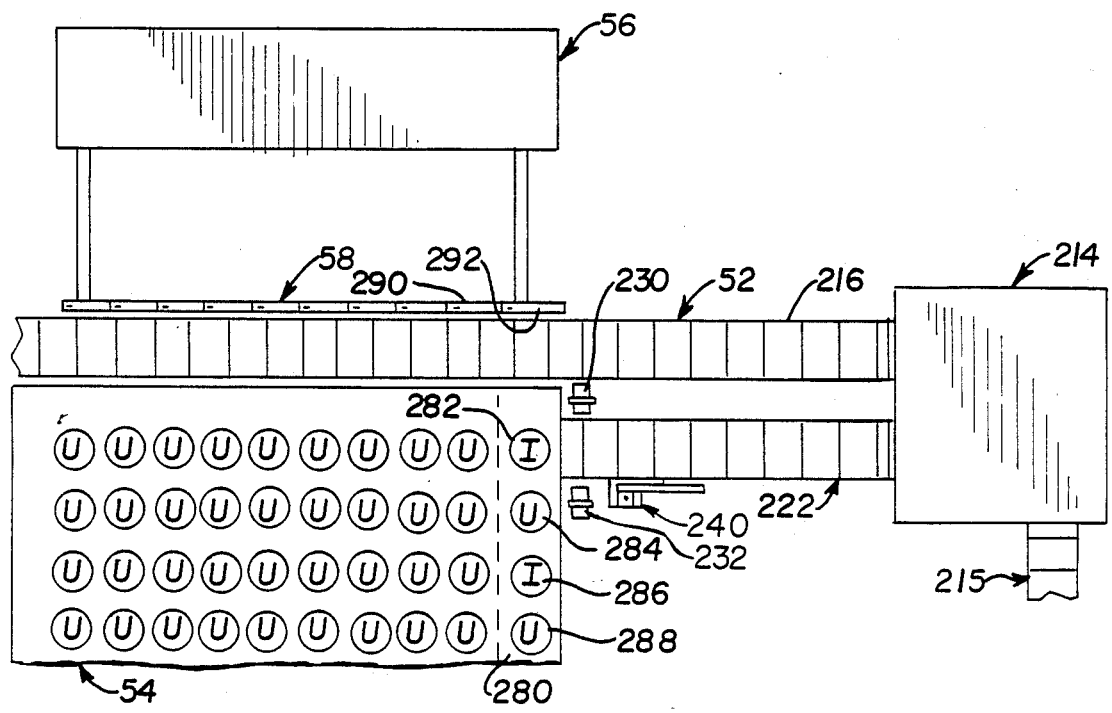
FIG. 13 is a plan view of the inspection apparatus of the present invention operated in a different manner from that of FIG. 12.

Referring to FIG. 13, this embodiment shows a lane 280 which is adapted to both function to transport inspected containers 282, 286 and uninspected containers 284, 288. In operating this type of system, when it is desired to sample inspect a particular container, the proper one of the gates of the pusher bar will be opened so that forward movement of the pusher bar 58 will result in the container to be inspected not being introduced into the lehr 54 at that time. Reject conveyor 215 will be employed to remove containers which do not pass inspection. In employing this type of arrangement, the control means must coordinate the opening of the proper gate in the pusher bar 58. The control means must also signal the actuator for the pusher bar 58 to leave a space in lane 280. In general, this will be accomplished most readily by having sensors 230, 232 sense the presence of a container therebetween, actuating the pusher bar 58 before an uninspected container is aligned with lane 280 and as the pusher bar 58 urges the nine uninspected containers for delivery into the lehr 54 having the delivery mechanism 240 deliver the inspected container such as 282 into lane 280 in the gap.

It will be appreciated that the control means has information regarding which particular mold in the forming machine 2 has produced a specific container and that a determination will be made as to when a given sampling will be made and as to which mold the sample will be taken from. For example, referring once again to FIGS. 12 and 13, the sample to be introduced into the inspection apparatus 214 will be determined based upon timing since the correspondence between the container from a given mold and a particular gate of the stacker bar 58 is known. In the case of FIG. 12, the pusher bar 58 will be shortened as it is not desired to have any but inspected containers in lane 250. In the alternative shown in FIG. 13, sampling is effected in the same fashion, the difference being that if it is desired to return an inspected container 282 to the lehr 54, the pusher bar 58 is actuated when the forward-most container is aligned with the gate upstream from gate 292.

Figure 14:
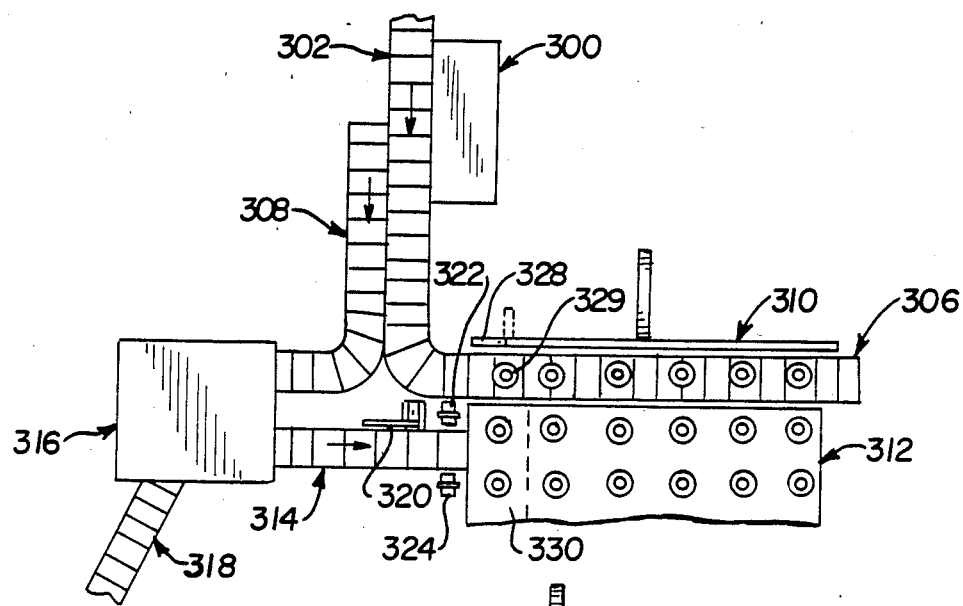
FIG. 14 is a plan view of a modified form of inspection apparatus of the present invention.
Figure 14A:
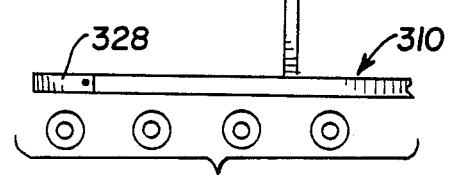
FIG. 14A is a detail of the gate position thereof.
Figure 15:
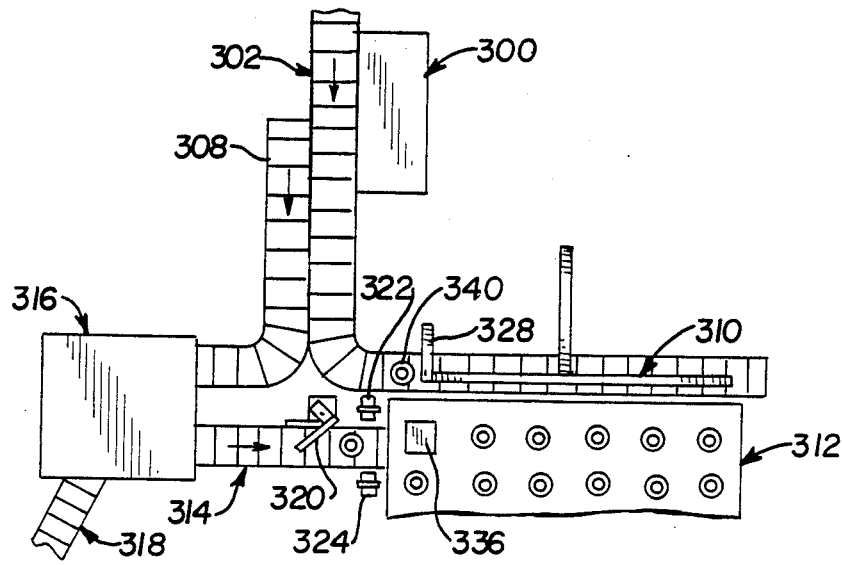
FIG. 15 is a top plan view of the apparatus of FIG. 14 in a modified position.
Figure 15A:
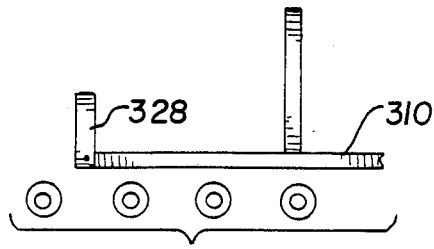
FIG. 15A illustrates a detail of the open gate position.

Referring to FIG. 14 an alternate arrangement is illustrated. In this arrangement a container selector means 300 is positioned adjacent to take-away conveyor 302 which is operatively associated with primary conveyor 306 adjacent to which are positioned pusher bar 310 and annealing lehr 312. The sample delivery conveyor 308 is disposed adjacent to take-away conveyor 302. The container selector means 300 transfers a predetermined container desired to be inspected from conveyor 302 to conveyor 308. This mechanism may be any conventional mechanism of this type which may determine selection by timing or other means. The selected container passes into the hot end inspection area equipment 316 and is inspected. If the container does not pass inspection, it is discarded through conveyor 318. If it does pass inspection, return conveyor 314 delivers the same to lehr 312 by means of delivery mechanism 320 which may be identical to delivery means 240 (FIG. 13). Sensors 322, 324 detect the presence of a container on return conveyor means 314 adjacent to the lehr 312. In this embodiment as is shown in FIGS. 14 and 14A, the pusher bar has a gate 328 disposed closest to the inspection equipment 316. When it is desired to employ lane 330 for both uninspected and inspected containers, the gate 328 may be closed as is shown in FIG. 14A to deliver a full array of uninspected containers to the lehr 312. Alternately, gate 328 may be opened. Then container 329 remains on conveyor 306, thereby creating a gap in lane 330 which may be filled by a container emerging from return conveyor 314. This concept is illustrated in FIGS. 15 and 15A wherein the pusher bar 310 has been advanced while the gate 328 open and a void 336 being present in the lehr. Container 340 which is adjacent to open gate 328 will be the first container or lead container in the next array which is introduced into the lehr 312. It will be appreciated that the control means will signal the pusher bar 310 to initiate the next cycle earlier than normal.

Figure 16:
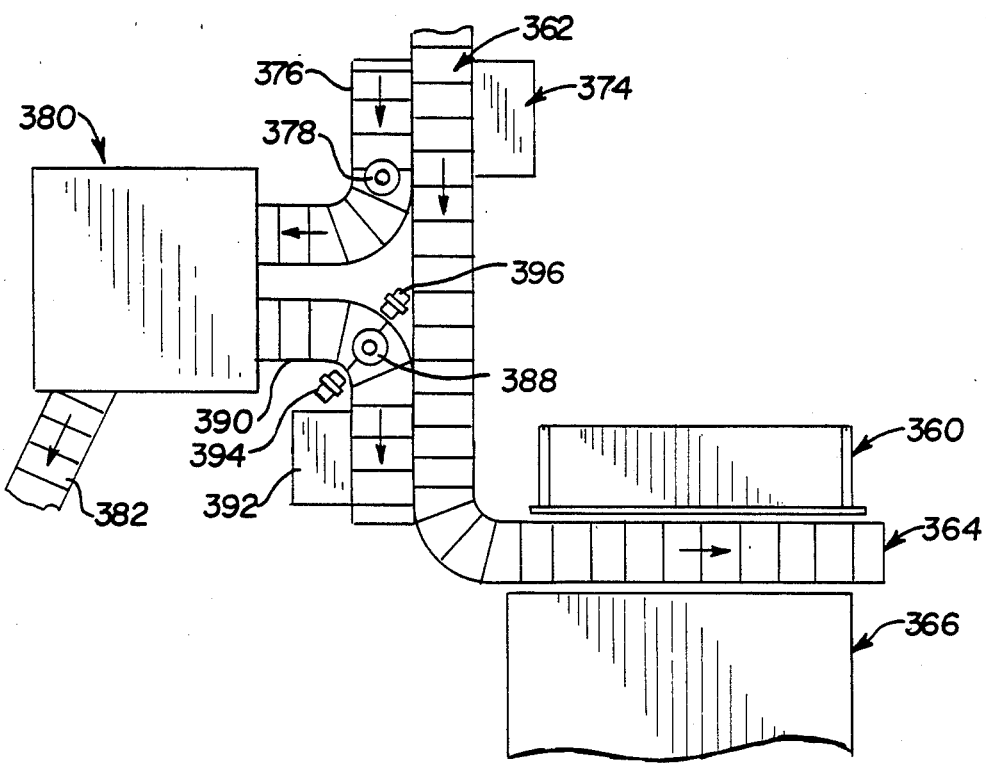
FIG. 16 is a top plan view of a modified form of inspection system of the present invention.
Figure 17:
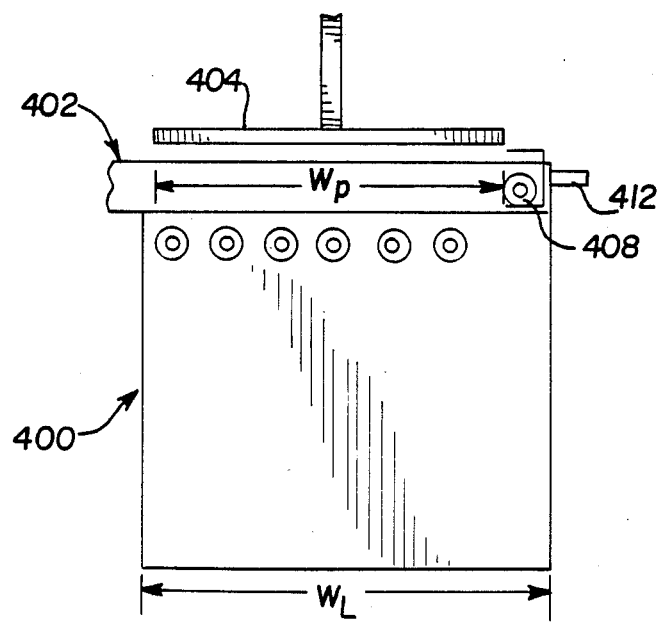
FIG. 17 is a schematic plan view showing a modified form of stacker of the present invention.

Referring to the embodiment shown in FIG. 16 wherein a stacker 360 cooperates with a take-away conveyor 362 of a primary conveyor 364 and a lehr 366. In this embodiment a container selector at 374 transfers a container to be inspected from take-away conveyor 362 to delivery conveyor 376 of inspection means 380. Container 378 is shown as having been selected for this purpose as transported by delivery conveyor 376 to inspection means 380. Rejected containers are removed from the system on conveyor 382. Successfully inspected containers such as 388 are delivered by return conveyor 390 to take-away conveyor 362 (or primary conveyor 364) by means of second container selector 392. Sensors 394, 396 determine the presence of a successfully inspected container 388 which will be returned to take-away conveyor 362 by container selector 392. If desired, this same approach may be employed to return an inspected conveyor to the primary conveyor 364.

Referring to FIGS. 17 through 20 another embodiment of the invention will be considered. In this embodiment, a lehr 400 receives containers from a primary conveyor 402 as a result of reciprocating movement of pusher bar 404 (shown schematically). When a container has been isolated for inspection by the motion of the gated pusher bar, it continues down the primary conveyor 402 into container selector 410. It is then delivered to the inspection area and returned to a lane in the lehr reserved for inspected containers. It will be appreciated that the pusher bar 404 is of width $W_p$ which is less than the width $W_L$ of the lehr. This avoids interference between pusher bar 404 and container selector 410 within which container 408 is positioned in FIG. 17.

Figure 18:
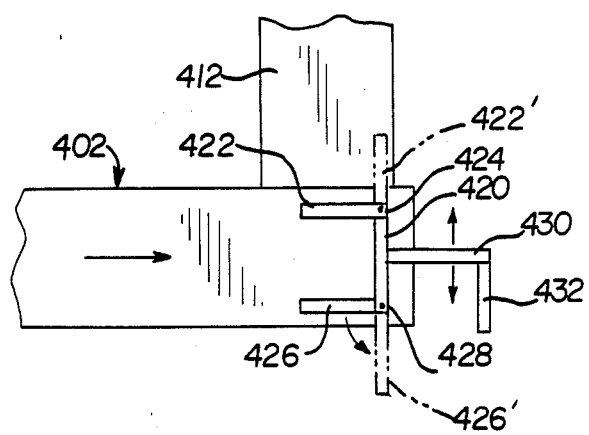
FIGS. 18 through 20 are partially schematic plan views showing a modified form of container receiving apparatus in various positions.
Figure 19:
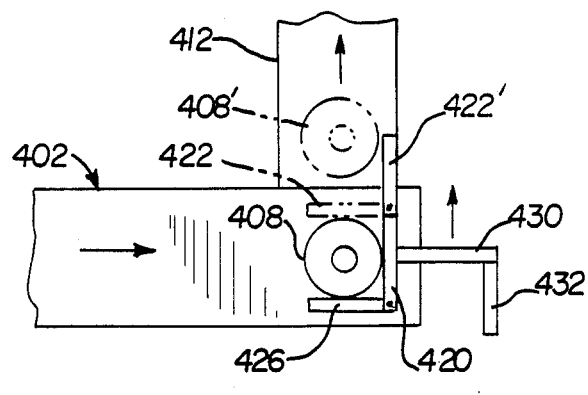
Figure 20:
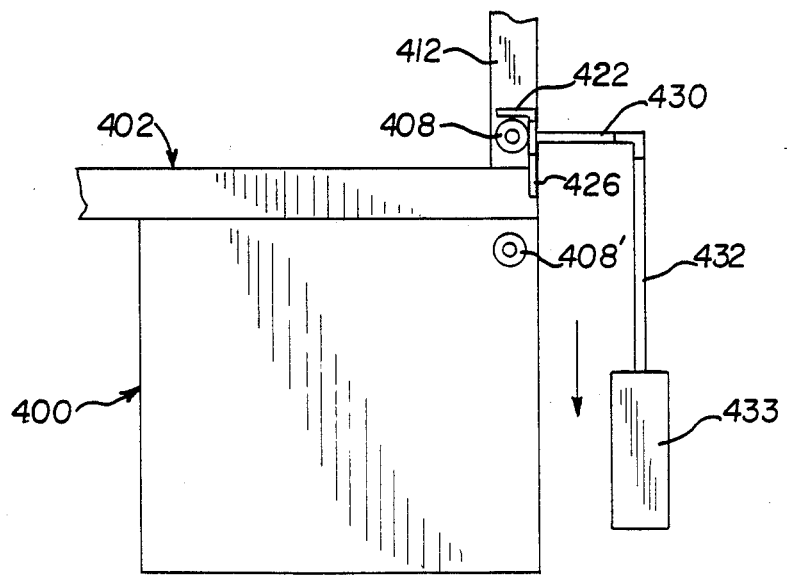

As is shown in FIG. 18, the container receiver has a generally U-shaped portion having a base wall 420, a first lateral wall 422 which is pivoted about a vertical axis 424 and is adapted to move between position shown in solid in FIG. 18 and the dotted position 422'. Similarly, second lateral wall 426 is pivoted about a vertical axis 428 and is adapted to assume rotated position 426'. Fixedly secured to base wall 420 is a connector rod 430 to which is secured an actuator rod 432 which is secured to a suitable form of power (not shown) such as a hydraulic or pneumatic cylinder, for example, which will effect reciprocation of connecting rod 430 in the directions indicated by the arrows responsive to control means action. The primary conveyor 402, as shown in FIG. 19 delivers bottle 408 to delivery conveyor 412 of the inspection means by having first lateral wall 422 rotated 90 degrees to the position shown in 422' and having second lateral wall 426 in a position perpendicular to base wall 420. With the channel defining walls 420, 422, 426 in this position, connecting rod 430 is moved in the direction indicated by the arrow, i.e. toward the top of the page to deliver the container 408 to conveyor 412. In the dotted position shown in FIG. 19, container 408' has been delivered to conveyor 412 and second lateral wall 422 is in position 422'. After inspection has been completed, as is shown in FIG. 20, delivery conveyor 412 is reversed to return the container which has been inspected successfully to primary conveyor 402. When the returning container 408 reaches position on the delivery conveyor 412 shown in FIG. 20, conveyor 412 stops and the control means activates container selector 410. The first lateral wall moves to position 422 and the second lateral member 426 moves to the position shown in FIG. 20. Cylinder 433 retracts in the direction of the arrow moving the container across the primary conveyor 402 and into the lehr 400. In this manner the inspected container is introduced into the lehr 400. Second lateral wall 426 is then returned to the position shown in FIG. 18 in order to initiate the next cycle of operation.

Any suitable means for effecting rotational movement of lateral walls 422, 426 such as hydraulic or pneumatic actuators, for example, may be employed and are well known to those skilled in the art.

It will be appreciated that the method of the present invention may advantageously be employed in the hereinbefore disclosed apparatus. A series of containers are transported on a primary conveyor, such as 52 of FIG. 7 or 402 of FIG. 17, which moves containers to a position between a pusher bar such as 58 of FIG. 7 or 404 of FIG. 17, and a lehr, such as 54 or 400 of FIGS. 7 or 17, respectively. The pusher bar actuates when a single file array of spaced containers is in front of the pusher bar. The pusher bar 58, 404 is then employed to transfer less than all of the containers to the lehr. The container not transferred to the lehr is delivered to inspection means wherein the inspection is effected.

In one embodiment of the method the pusher bar is provided with a series of gates of sufficient size to permit passage of a said container therethrough such as in the case of pusher bar 58. In another embodiment, the pusher bar is of reduced relative width with respect to the width of the array of containers. In each case, movement of the pusher bar toward the lehr serves to retain on the primary conveyor the predetermined container to be inspected. After inspection, containers which have been passed are returned to the lehr or conveyor means for introduction into the lehr.

In general, it will be advantageous to employ the method with a forming machine containing molds wherein containers are formed such that the inspection may be effected at the hot end of the lehr.

Control means are provided to coordinate operation of the conveyor means, the pusher bar, the lehr and the inspection means. The inspection means will generally be provided with conveyor means to deliver the container from the primary conveyor to the inspection equipment and conveyor means to return containers which pass inspection to either the take-away conveyor means, the primary conveyor or the lehr directly.

Figure 21:
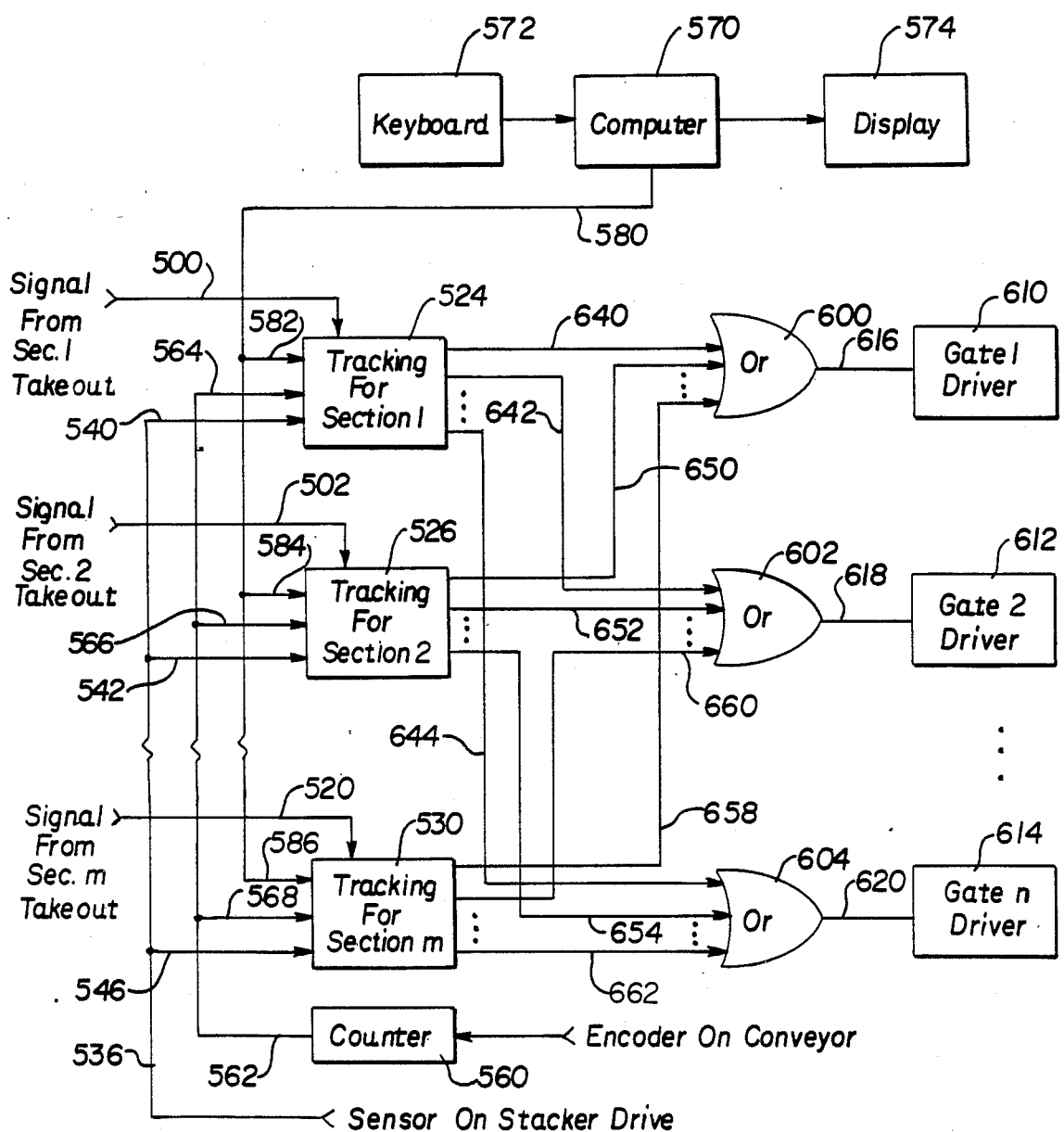
FIGS. 21 and 22 are schematic illustrations of control means suitable for use in the present invention.

Referring to FIG. 21 there is shown schematically a form of control means which may be employed in a system of the invention such as that illustrated in FIG. 13. A series of signals 500, 502 and 520 which correspond in number to the number of mold sets in the forming machine are provided. Signal 500 corresponds to section 1 of the take-out conveyor disposed adjacent to the first mold set, signal 502 corresponds to section 2 of the take-out conveyor and signal 520 corresponds to section m of the take-out conveyor corresponding to mold set m (not shown). It will be appreciated that the number of signals 500, 502, 520 will correspond with the number of mold sets with one such signal being provided for each such mold set. Tracking blocks 524, 526, 530 receive signals, respectively, from their respective sections of the take-out conveyor. In addition, in the form illustrated, each tracking block 524, 526, 530 receives three additional signals.

A signal from the forming machine (not shown) occurs when a container from a particular mold set within a particular section is moved onto the take-away conveyor. For example, when a container from section 1 is set on the take-away conveyor, a signal is emitted over line 500 and to tracking block 524. These signals may either be present in the control portion of the forming machine or can be furnished by any conventional or other desired sensor means positioned near the means used by the forming machine to introduce containers onto the take-away conveyor.

A sensor on the lehr stacker 56 (FIG. 13) is emitted just as the pusher bar 58 is about to begin its forward motion to move a group of containers from the primary conveyor into lehr 54. This signal is furnished over line 536 to tracking block 524 by line 540, to tracking block 526 by line 542 and to tracking block 530 by line 546. It will be appreciated that regardless of how many tracking blocks are present, each will receive a signal from the sensor on the stacker drive.

An incremental encoder (not shown) which outputs a pulse for a given amount of motion of the take-away and primary conveyors has its output signals introduced into counter 560. The encoder tracks the motion of the conveyors and may preferably be a contacting wheel which rides on the conveyor top. As a result, the encoder's output is an accurate measure of the motion of the conveyors and the containers moving on the conveyor. The output of counter 560 is introduced into each tracking block 524, 526, 530 over line 562 through connections 564, 566, 568, respectively.

Shown in the upper portion of FIG. 21 is a computer 570 which has a keyboard input 572 for entry and a display 574 for presenting human-readable output. The fourth signal introduced into the tracking blocks 524, 526, 530 is emitted from computer on line 580 and is respectively introduced into tracking blocks 524, 526, 530 over lines 582, 584 and 586. This fourth signal enables one and only one of the tracking blocks depending on which section of the forming machine is producing the container desired to be inspected. The computer may be programmed in any suitable manner readily known to those skilled in the art.

A signal from the computer 570 tells one of the tracking blocks 524, 526, 530 that it is to select a container. The computer preferably has a look-up table to convert the mold number which has been input by an operator to the section number of the forming machine where that mold number is being manufactured. The computer may also preferably include a timer and programming to select automatically one container from each section at a predetermined time interval. As has been indicated hereinbefore, it is preferred that a cracking block such as 524, 526, 530 be provided for each section of the forming machine corresponding to each mold set.

The tracking blocks 524 526, 530 store the count received from encoder counter 560 which is emitted by the counter 560 instantaneously with receipt of the signal from the take-out. This number will be considered as $N_a$. The tracking block also contains the expected number of counts between a container being received on the take-out conveyor and it arriving at a particular gate on the pusher bar. These numbers will be considered as $N_1$, $N_2$ and $N_m$, for purposes of discussion. When the tracking block receives a signal from the sensor on the stacker drive by way of line 536, it stores the value in the encoder counter. This number will be considered as $N_b$. By determining $N_b - N_a$ and comparing this number with the numbers $N_1$, $N_2$, $N_m$, the tracking block determines whether it finds a match within a small predetermined tolerance. If it does find a match it activates an output which represents the fact that a container made in its particular section which, for example, in tracking block 524 would be section 1 of the forming machine, is at a particular gate. If no match is found, no output is activated. If more than one match is found, the block chooses one of them and ignores the others. It will generally be preferred to provide each tracking block with as many outputs as there are gates on the stacker pusher bar. The outputs of the tracking blocks 524, 526, 530 are, respectively, operatively associated with OR gates 600, 602, 604. Each OR gate 600, 602, 604 is connected to gate drivers 610, 612, 614, respectively, by lines 616, 618, 620, respectively. The outputs of the OR gates activate the drivers 610, 612, 614 in order to activate the gate operating means such as an air valve or rotary solenoid in order to move the appropriate pusher bar gate thereby leaving the desired container on the primary container.

It will be appreciated that there is an OR gate 600, 602, 604 for each gate in the pusher bar which is adapted to be operated by a driver 610, 612, 64 and that output signals from each tracking block 524, 526, 530 is introduced into each OR gate 600, 602, 604. For example, tracking block 524 provides signals to OR gates 600 on line 640 to OR gate 602 on line 642 and on line 644 to OR gate 604. The lines connecting tracking block 526 to OR gates 600, 602, 604 are, respectively, 650, 652, 654. Tracking block 530 is connected to OR gate 600, 602, 604, respectively, by lines 658, 660 and 662. Each of the OR gates receive signals indicating when a desired container is in front of its associated gate. It will be appreciated that there are as many OR gates as there are gates in the pusher bar. Each OR gate has as many inputs as there are sections in the forming machine.

Figure 22:
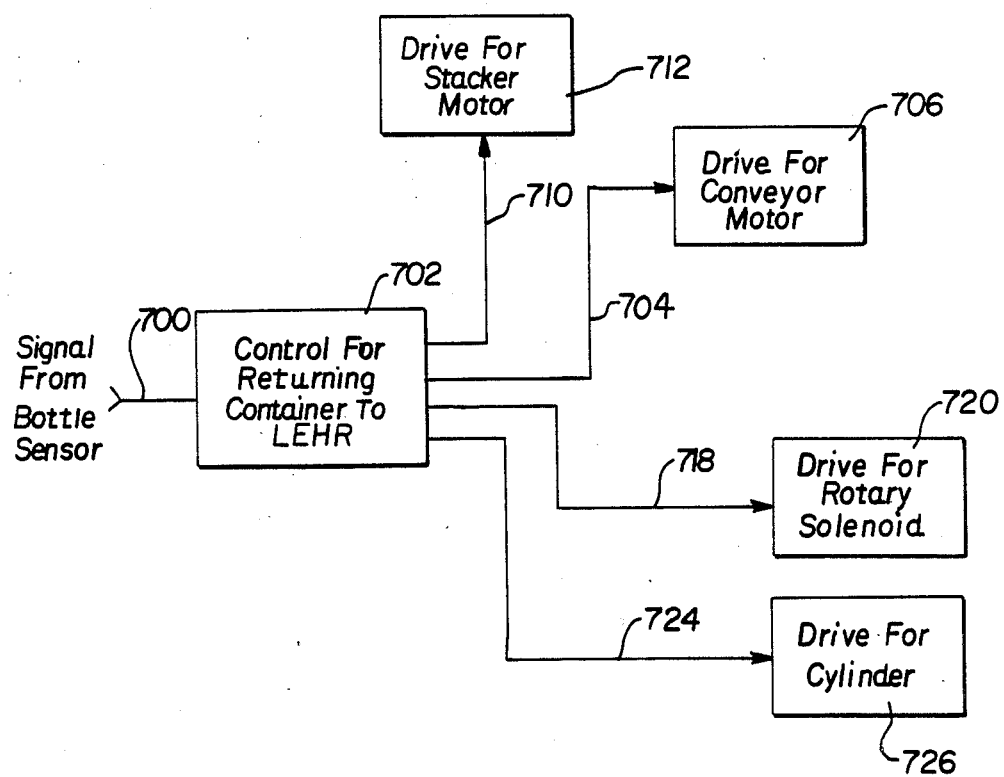

Referring to FIGS. 13 and 22, a preferred approach to providing control means for return of an acceptable inspected container to the primary conveyor or lehr will be considered. Signals from sensors 230, 232 (FIG. 13) which detect the presence of a bottle on return conveyor 222 are by line 700 introduced into control block 702. When the presence of a container is sensed and a signal is received by control block 702 the control block 702 emits a signal over line 704 to conveyor motor drive 706 in order to stop conveyor 222. It also emits a signal over line 710 instructing the drive for the stacker motor 712 to initiate a cycle earlier than normal. In the instance shown in FIG. 13, the cycle begins when only nine containers are on the primary conveyor 52 in front of the pusher bar 58 instead of the usual ten. This leaves an empty space in the righthand-most lane of the lehr 54. After a suitable delay following movement of the pusher bar 58 with nine containers on the primary conveyor, the empty space created by the use of nine containers will be positioned in a location opposite conveyor 222. The control block 702 provides a signal over line 718 to driver 720 which activates rotary solenoid 246 (FIG. 7A) to move the arm 242 of delivery means 240 to a position behind the container which is positioned on the return conveyor 222. When the arm is in place, the control block 702 emits a signal over line 724 to activate an air valve through an appropriate driver thereby causing the cylinder 245 to extend moving the container into the empty space on the lehr conveyor belt. The cylinder is then retracted and the return conveyor is restarted. The stacker drive is returned to normal operation and pushes ten containers into the lehr on each cycle.

It will generally be desirable to provide display means which either record or display the results of an inspection of a container in order to permit an operator to make adjustments to the forming machine or to make other adjustments responsive to unsuccessful inspection reports. If desired, the system may be automated and function as a servomechanism wherein defects found in the sample containers which have been inspected result in automated adjustment to the container forming machine.

It will be appreciated that depending upon the frequency with which a particular property is likely to change, the sampling times for inspection may be varied as desired. In general, the sampling times may be in the order of about 1 to 60 minutes between samples of containers taken from the same mold with respect to glass containers. It will be appreciated that one of the advantages of the invention is that feedback of information regarding defects is obtained more promptly as inspection is effected at the hot end of the lehr rather than waiting the significant period of time which may be on the order of twenty minutes, for example, to inspect the containers at the cold end of the lehr.

It will be appreciated that the present invention provides an effective means for isolating predetermined containers for inspection at the hot end in an efficient manner. It will further be appreciated that the apparatus and method of the present invention effects this removal of predetermined containers to be inspected in a manner which permits effective monitoring of all molds which are producing containers, effects timely inspection and permits easy withdrawal of the container to be inspected and return of the same if inspection is satisfactory. All of this may be accomplished while either reserving a specific lane of the lehr for return of successfully inspected containers or, in the alternative, coordinating return of successfully inspected containers to a lane which also carries uninspected containers.

As has been indicated hereinbefore, the inspection equipment may take the form of any conventional or unconventional equipment designed to inspect for desired properties in a particular container and forms no part of the invention. Characteristics for which inspection might be desired are container wall thickness, container outer and inner dimensions, container symmetry, container weight and container volume.

If desired, mold symbols may be placed on the containers in the molding operation as a means for facilitating identification of the particular mold from which a container emerged.

In a preferred practice of the invention, the control means will permit determination of the mold from which a container originated based upon position on the conveyor means without requiring or using mold symbols.

Whereas particular embodiments of the invention have been described above for purposes of illustration, it will be evident to those skilled in the art, that numerous variations of the details may be made without departing from the invention as defined in the appended claims.

We claim:

1. Apparatus for transporting and inspecting containers comprising
    annealing lehr means for cooling said containers,
    primary conveyor means disposed adjacent to said annealing lehr means for transporting said containers positioned adjacent to said annealing lehr means,
    inspection means for inspecting at least some of said containers,
    stacker means disposed on the opposite side of said conveyor means from said annealing lehr means for transferring containers from said primary conveyor means to said annealing lehr means,
    said stacker means having a reciprocating pusher bar for contacting said containers and urging them toward said lehr means, and
    said pusher bar having means for delivering less than the total number of said containers on said primary conveyor means to said annealing lehr means, whereby predetermined containers may be delivered to said inspection means for inspection.

2. The apparatus of claim 1 including
    said pusher bar means being mounted for reciprocation in a path generally perpendicular to the path of movement of said primary conveyor means.

3. The apparatus of claim 2 including
    said pusher bar having gate means for permitting a container aligned therewith to remain on said primary conveyor means while the remainder of said containers are transferred to said annealing lehr means.

4. The apparatus of claim 3 including said gate means having a plurality of gates.

5. The apparatus of claim 4 including control means for timing the opening of said gates when they are aligned with said containers, whereby opening a said gate will permit passage of a container therethrough when said pusher bar delivers the remaining containers to said annealing lehr means.

6. The apparatus of claim 5 including actuator means for opening and closing said gates.

7. The apparatus of claim 5 including said gate being slidable between open and closed positions.

8. The apparatus of claim 6 including said gates being rotatable about a generally vertical axis.

9. The apparatus of claim 6 including said gates being rotatable about a generally horizontal axis.

10. The apparatus of claim 6 including said inspection means having delivery conveyor means operatively associated with said primary conveyor means for receipt of containers to be inspected therefrom, inspection equipment for receiving said containers from said delivery conveyor means, inspecting said containers and return conveyor means for returning acceptable containers from said inspection equipment to said conveyor means or said annealing lehr means.

11. The apparatus of claim 10 including
said inspection means having means for discarding rejected containers.

12. The apparatus of claim 10 including
said control means having means for determining which said container is to be inspected and opening the pusher bar gate aligned therewith.

13. The apparatus of claim 12 including
said return conveyor means having a discharge end operatively associated with said annealing lehr means, and
transfer means disposed adjacent to said discharge end for transferring inspected containers to said annealing lehr means.

14. The apparatus of claim 13 including
said transfer means having a rotatable arm which rotated about an axis disposed adjacent to said return conveyor means and contact said containers to transfer them to said annealing lehr means.

15. The apparatus of claim 14 including
said control means having means for coordinating delivery of said inspected containers from said return conveyor means to said annealing lehr means with delivery of uninspected containers from said primary conveyor means to said annealing lehr means.

16. The apparatus of claim 15 including
said annealing lehr means having means for transporting said containers from an entry hot end to a discharge cold end thereof.

17. The apparatus of claim 16 including
forming machine means having mold means for creating said containers,
take-away conveyor means for receiving said containers from said forming means and delivering them to said primary conveyor means, and
said control means having means for determining which mold has produced each said container, whereby said pusher bar means gates will remove a said container from a predetermined mold for inspection.

18. The apparatus of claim 17 including
said annealing lehr means having a portion thereof employed solely for transporting inspected containers therethrough.

19. The apparatus of claim 17 including
container detector means operatively associated with said return conveyor means to confirm the presence of a said container, and
said control means having means for operating said transfer means responsive to a receipt of a signal from said container detector means indicating the presence of a said container.

20. The apparatus of claim 1 including
said primary conveyor means having means for providing said containers spaced over a predetermined width of said annealing lehr means,
container selector means disposed adjacent one end of said primary conveyor means for receiving a container to be inspected, and
said pusher bar having a width less than said predetermined width, whereby when said pusher bar may move said containers into said annealing lehr means without interfering with said container selector means.

21. The apparatus of claim 20 including
display means for displaying information received from said inspection means.

22. The apparatus of claim 1 including
said pusher bar having a plurality of gates which when open will permit a container to pass therethrough, whereby the container passing through said gate will not be moved with the other containers being moved by said pusher bar.

23. The apparatus of claim 22 including
each said gate being movable between an open position and a closed position independently of the other said gates.

24. The apparatus of claim 22 including
said gates being slidable between said open position and said closed position.

25. The apparatus of claim 22 including
said gates being rotatable between said open position and said closed position.

26. The apparatus of claim 25 including
said gates being rotatable about a generally horizontal axis.

27. The apparatus of claim 25 including
said gates being rotatable about a generally vertical axis.

28. The apparatus of claim 23 including
means for moving said gates between said open and closed positions.

29. A method of transporting and inspecting containers comprising
providing primary conveyor means for transporting said containers, annealing lehr means for receiving containers from said primary conveyor means, stacker means having pusher bar means for transferring containers from said primary conveyor means to said annealing lehr means and inspection means,
transporting a group of containers on said primary conveyor means,
transferring by said pusher bar means less than all said containers to said annealing lehr means, and
delivering a said container not so transferred to said inspection means.

30. The method of claim 29 including
providing said pusher bar means with a series of gates of sufficient size to permit passage of a said container therethrough,
opening a said gate, aligning a desired container to be inspected with said gate, moving said pusher bar to engage and transfer all said containers except said desired container which desired container passes through said open gate, and delivering said desired container to said inspection means.

31. The method of claim 30 including providing said inspection means with delivery conveyor means for receiving said desired container from said primary conveyor means, inspection equipment for receiving and inspecting said desired container and delivery conveyor means for returning acceptable containers to said primary conveyor means or said annealing lehr means, and delivering said acceptable containers to a desired position on said annealing lehr means.

32. The method of claim 29 including delivering said containers not being inspected to said annealing lehr means in a series of rows, and reserving a portion of said annealing lehr means for sole use by said inspected containers.

33. The method of claim 29 including delivering uninspected containers to all rows of said annealing lehr means, and coordinating return of said inspected containers with the transfer of said uninspected containers, whereby efficient flow may be effected.

34. The method of claim 29 including establishing a line of containers of a predetermined width on said primary conveyor means to be transferred to said annealing lehr means, providing a said pusher bar of a width less than said predetermined width, and selecting a container to be inspected by causing said pusher bar to deliver all said containers except said selected container to said annealing lehr means as a result of the reduced relative width of said pusher bar.

35. The method of claim 30 including providing take-away conveyor means disposed adjacent to a container forming machine and cooperating with said primary conveyor means to delivery containers thereto, determining which mold of said forming machine made a particular container, and selecting a said container for inspection based at least in part upon the mold which made said container.

36. The method of claim 35 including employing said method to inspect glass containers.

37. The method of claim 36 including said annealing lehr means having an entry hot end and an exit cold end, and effecting said inspection of said containers on a sampling basis prior to entry of said containers into said entry hot end.

38. The method of claim 36 including displaying information obtained from said inspection, whereby detected defects may be resisted in subsequent container manufacture.

39. The method of claim 35 including tracking movement of a container to be inspected from its entry on a section of said take-away conveyor means until it its delivered to one of said pusher bar gates.

40. The method of claim 39 including employing encoder means in effecting said tracking.

41. Apparatus for transporting and inspecting containers comprising forming machine means having mold means for creating said containers, annealing lehr means for cooling said containers, primary conveyor means disposed adjacent to said annealing lehr means for transporting said containers positioned adjacent to said annealing lehr means, take-away conveyor means for receiving said containers from said forming machine means and being operatively associated with said primary conveyor means, inspection means for inspecting said containers on a sampling basis, stacker means disposed on the opposite side of said conveyor means from said annealing lehr means for transferring containers from said primary conveyor means to said annealing lehr means, said stacker means having a reciprocating pusher bar for contacting said containers and urging them toward said lehr means, said inspection means having delivery conveyor means for receiving containers to be inspected from said take-away conveyor means, inspection apparatus for receiving containers from said delivery conveyor means and inspecting said containers, return conveyor means for receiving containers which have passed said inspection from said inspection apparatus and transporting said containers, said inspection means having means for inspecting said containers prior to entry of said containers into said lehr means, said return conveyor means being operatively associated with said either said take-away conveyor or said primary conveyor means to deliver inspected containers thereto, and reject conveyor means operatively associated with said inspection apparatus for receiving rejected containers therefrom.

42. The apparatus of claim 41 including said return conveyor means being operatively associated with said lehr for delivering inspected containers thereto.

43. Apparatus for transporting and inspecting containers comprising forming machine means having mold means for creating said containers, annealing lehr means for cooling said containers, primary conveyor means disposed adjacent to said annealing lehr means for transporting said containers positioned adjacent to said annealing lehr means, take-away conveyor means for receiving said containers from said forming means and being operatively associated with said primary conveyor means, inspection means for inspecting at least some of said containers, said inspection means having delivery conveyor means for receiving containers to be inspected from said take-away conveyor means, inspection apparatus for receiving containers from said delivery conveyor means and inspecting said containers, return conveyor means for receiving containers from said inspection apparatus and transporting said containers, stacker means disposed on the opposite side of said conveyor means from said annealing lehr means for transferring containers from said primary conveyor means to said annealing lehr means, said stacker means having a reciprocating pusher bar for contacting said containers and urging them toward said lehr means, said inspection means having means for inspecting said containers prior to entry of said containers into said lehr means, and said pusher bar having means for delivering less than the total number of said containers on said primary conveyor means to said annealing lehr means, whereby predetermined containers may be delivered to said inspection means for inspection.

44. The apparatus of claim 43 including
said pusher bar means being mounted for reciprocation in a path generally perpendicular to the path of movement of said primary conveyor means, and
said pusher bar having gate means for permitting a container aligned therewith to remain on said primary conveyor means while the remainder of said containers are transferred to said annealing lehr means.

45. A method of transporting and inspecting containers comprising
providing primary conveyor means for transporting said containers, annealing lehr means for receiving containers from said primary conveyor means, stacker means having pusher bar means for transferring containers from said primary conveyor means to said annealing lehr means and inspection means,
providing take-away conveyor means disposed adjacent to a container forming machine and cooperating with said primary conveyor means to delivery containers thereto,
transporting containers on said take-away conveyor means from said forming machine to said primary conveyor means,
providing inspection means having inspection apparatus for inspecting some of said containers prior to introduction of said containers into said lehr means,
employing delivery conveyor means to transport containers to be inspected from said take-away conveyor to said inspection apparatus,
employing return conveyor means to transport containers passing inspection away from said inspection apparatus.
periodically removing a container as a sample to be tested from said take-away conveyor means and inspecting said container,
if a said container passes inspection, delivering said inspected container directly or indirectly to said lehr means, and if said container fails to pass inspection diverting it from said lehr means, whereby said inspection system will, on a sampling basis, inspect some of said containers with acceptable containers being returned to the system for delivery to said lehr means and rejected containers being diverted from said lehr means.

46. The method of claim 45 including
delivering said containers which passed inspection by said return conveyor means from said inspection apparatus to said primary conveyor means.

47. The method of claim 45 including
delivering said containers which passed inspection by said return conveyor means from said inspection apparatus to said lehr means.

48. A method of transporting and inspecting containers comprising
providing primary conveyor means for transporting said containers, annealing lehr means for receiving containers from said primary conveyor means, stacker means having pursher bar means for transferring containers from said primary conveyor means to said annealing lehr means and inspection means,
providing take-away conveyor means disposed adjacent to a container forming machine and cooperating with said primary conveyor means to delivery containers thereto,
providing said pusher bar means with a series of gates of sufficient size to permit passage of a said container therethrough,
transporting containers on said take-away conveyor means from said forming machine to said primary conveyor means,
providing inspection means having inspection apparatus for inspecting some of said containers prior to introduction of said containers into said lehr means,
periodically removing a container from said take-away conveyor means and inspecting said container,
employing delivery conveyor means to transport containers to be inspected from said take-away conveyor to said inspection apparatus,
employing return conveyor means to transport containers passing inspection away from said inspection apparatus,
if a said container passes inspection, delivering said inspected container directly or indirectly to said lehr means,
delivering said containers which passed inspection by said return conveyor means from said inspection apparatus to said lehr means,
opening a said gate,
aligning a desired container with said gate, and
moving said pusher bar means to engage and transfer all said containers into said lehr means except said desired container which desired container passes through said open gate.

* * * * *

UNITED STATES PATENT AND TRADEMARK OFFICE
CERTIFICATE OF CORRECTION

PATENT NO. : 4,801,319
DATED : January 31, 1989
INVENTOR(S) : DAVID A. RUGABER and RICHARD N. MAXSON It is certified that error appears in the above-identified patent and that said Letters Patent is hereby corrected as shown below:

Column 1, line 18, --a-- should be inserted before "container".

Column 2, line 8, "permit ting" should be --permitting--.

Column 2, line 14, a period --.-- should be inserted after "conveyor".

Column 10, line 24, "cracking" should be --tracking--.

Column 10, line 27, a comma --,-- should be inserted after "524".

Claim 14, column 13, line 40, "rotated" should be --rotates--.

Claim 48, column 18, line 21, "pursher" should be --pusher--.

Signed and Sealed this

First Day of August, 1989

Attest:

DONALD J. QUIGG

Attesting Officer

Commissioner of Patents and Trademarks